United States Patent
Stemmerich et al.

(10) Patent No.: US 10,239,698 B1
(45) Date of Patent: Mar. 26, 2019

(54) VIBRATORY BOWL FEEDER

(71) Applicant: Linear Group Services, LLC, Clawson, MI (US)

(72) Inventors: Robert Stemmerich, Rochester, MI (US); Anthony Costa, Rochester, MI (US)

(73) Assignee: Linear Group Services, LLC, Clawson, MI (US)

( * ) Notice: Subject to any disclaimer, the term of this patent is extended or adjusted under 35 U.S.C. 154(b) by 0 days.

(21) Appl. No.: 15/718,059

(22) Filed: Sep. 28, 2017

(51) Int. Cl.
| | |
|---|---|
| *B65G 47/14* | (2006.01) |
| *B65G 47/00* | (2006.01) |
| *B65G 47/02* | (2006.01) |
| *B65G 27/26* | (2006.01) |
| *B65G 27/02* | (2006.01) |

(52) U.S. Cl.
CPC ............ *B65G 27/02* (2013.01); *B65G 27/26* (2013.01)

(58) Field of Classification Search
None
See application file for complete search history.

(56) References Cited

U.S. PATENT DOCUMENTS

| | | | |
|---|---|---|---|
| 4,570,831 A | 2/1986 | Izumi et al. | |
| 4,941,565 A | 7/1990 | Hirota et al. | |
| 6,689,961 B2* | 2/2004 | Matsuyama | G01G 19/393 141/286 |
| 7,270,229 B2* | 9/2007 | Perazzo | B65G 11/063 198/391 |
| 7,325,671 B2 | 2/2008 | Super et al. | |
| 8,517,169 B2 | 8/2013 | Kirkbridge et al. | |
| 2003/0034228 A1* | 2/2003 | Takasan | B65G 27/00 198/752.1 |
| 2008/0210524 A1* | 9/2008 | Engblom | B28C 5/40 198/757 |
| 2016/0052719 A1* | 2/2016 | Ganzer | B29B 13/022 198/617 |

* cited by examiner

*Primary Examiner* — Kavel Singh
(74) *Attorney, Agent, or Firm* — Warner Norcross + Judd LLP

(57) ABSTRACT

An improved vibratory bowl feeder is provided. The improved vibratory bowl feeder includes a removable impact cone formed from an impact resistant material to deflect falling industrial workpieces toward the sidewall of a bowl. The impact cone includes a through-hole for a center bolt, the center bolt securing the impact cone to the bowl. An adhesive layer bonds the impact cone to the bowl, which is optionally formed from stainless steel. The impact cone includes a frusto-conical or hemispherical impact surface that deadens the impact from industrial workpieces falling from an overhead hopper. Replacement of the impact cone can be achieved within minimal downtime, and varying impact cones can be selected based on the size and the shape of the industrial workpieces for a given inspection run.

12 Claims, 4 Drawing Sheets

VIBRATORY BOWL FEEDER

FIELD OF THE INVENTION

The present invention relates to vibratory bowl feeders, in particular vibratory bowl feeders for the handling of bulk fasteners and other industrial workpieces.

BACKGROUND OF THE INVENTION

Many automated inspection and sorting machines require the precise orientation and spacing of incoming workpieces. Vibratory bowl feeders are particularly useful for this purpose, and generally include a bowl, a base, and an exciter. The bowl is supported above the base by one or more springs. When activated, the exciter imparts a vibration on the bowl, which vibrates in the vertical direction and in the horizontal direction. Loose workpieces within the bowl propagate upwardly along a spiral track provided on the internal circumference of the bowl for entry, one behind the other, into an inspection and sorting machine.

In many configurations, vibratory bowl feeders are positioned beneath a hopper. During continuous inspection runs, uninspected workpieces from the hopper fall into the bowl at a predetermined feed rate. Many existing vibratory bowl feeders include a flat or conical surface formed form a soft alloy, for example stainless steel, to limit damage to falling workpieces. Over time, however, this surface can become damaged after repeated impacts from the falling workpieces. The vibratory bowl feeder must then be removed from service for repair or replacement of the bowl. This process is labor intensive and can require the vibratory bowl feeder to be taken off line for as much as one week while the damaged bowl is serviced.

SUMMARY OF THE INVENTION

An improved vibratory bowl feeder is provided. The improved vibratory bowl feeder includes a removable impact cone formed from an impact resistant thermoplastic to deflect falling industrial workpieces toward the sidewall of a bowl. The impact cone includes a through-hole for a center bolt, the center bolt securing the impact cone to the bowl. An adhesive layer bonds the impact cone to the bowl, which is optionally formed from stainless steel. The impact cone includes a frusto-conical or hemispherical impact surface that deadens the impact from industrial workpieces falling from an overhead hopper. Replacement of the impact cone can be achieved within minimal downtime, and the shape of the impact cone can be selected based on the industrial workpieces for a given inspection run. Though described in connection with industrial workpieces herein, for example bolts, nuts, rivets, nails, and ball bearings, the impact cone can also be used in connection with other articles, including for example electronic subassemblies and pharmaceutical products.

These and other objects, advantages, and features of the invention will be more fully understood and appreciated by reference to the description of the current embodiment and the drawings. Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENT

Figure 1:
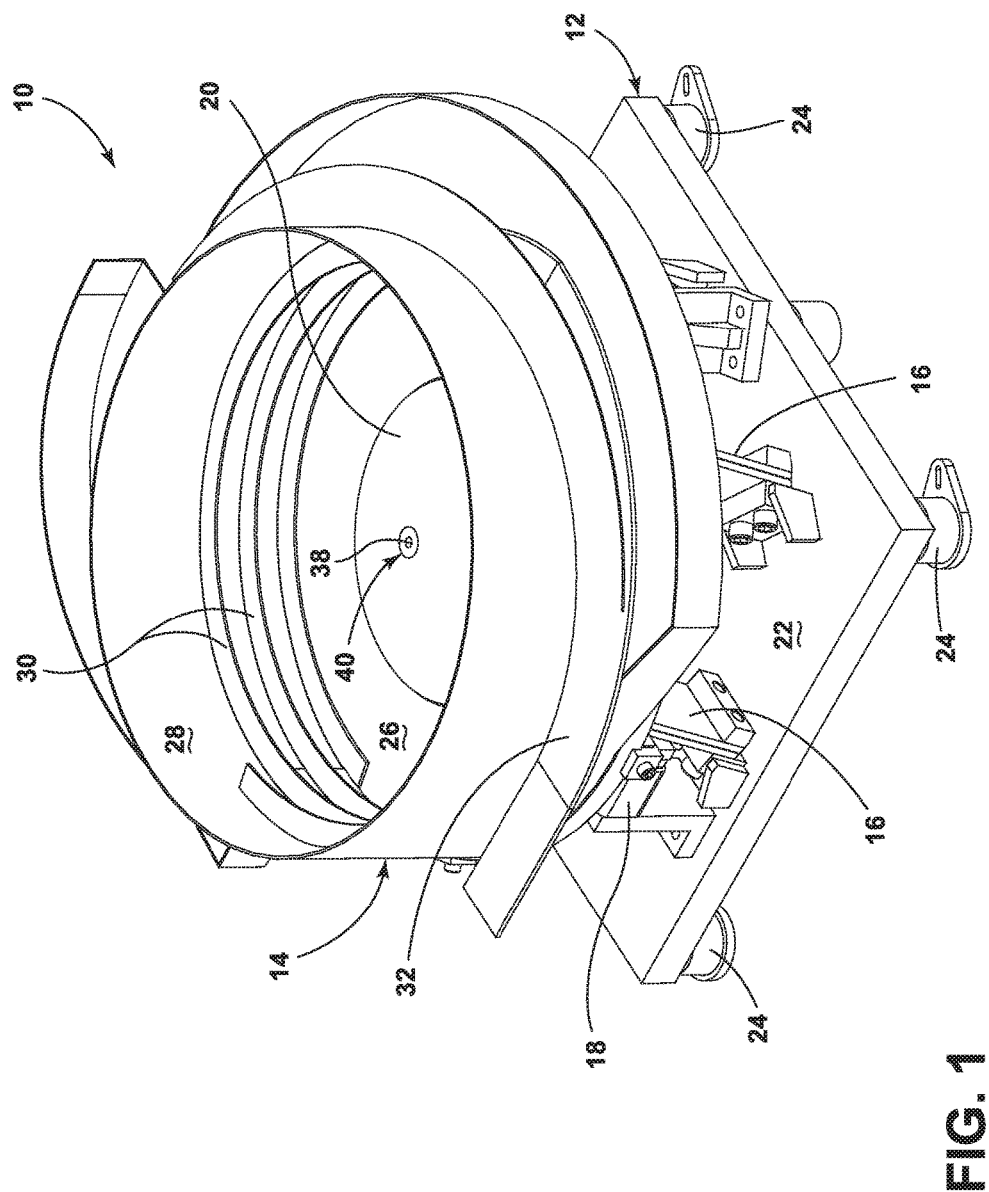
FIG. 1 is a perspective view of a vibratory bowl feeder in accordance with the current embodiment.
Figure 2:
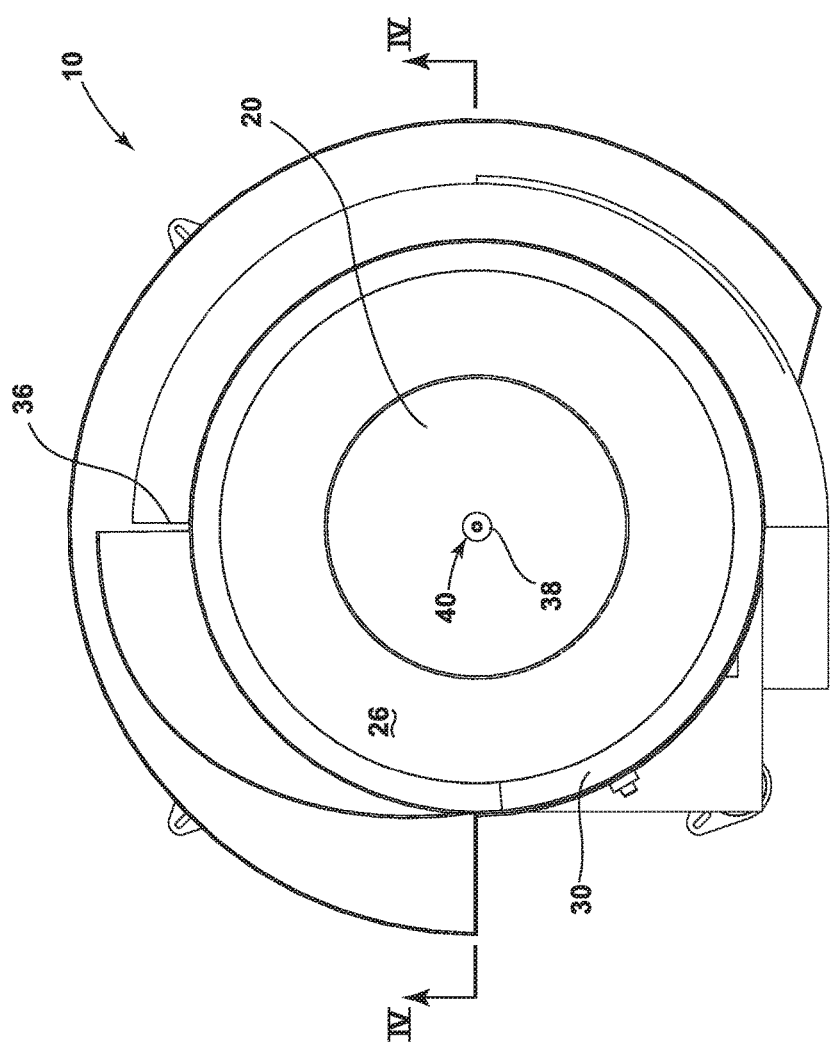
FIG. 2 is a top plan view of the vibratory bowl feeder of FIG. 1.

A vibratory bowl feeder in accordance with one embodiment is illustrated in FIGS. 1-4 and generally designated 10. The vibratory bowl feeder 10 includes a base 12, a bowl 14 above the base 12, a plurality of spring element 16 between the base 12 and the bowl 14, and at least one exciter 18 adapted to impart a vibration on the bowl 10. As also set forth below, the vibratory bowl feeder 10 includes a removable impact cone 20 formed of an impact resistant material. The impact cone 20 deadens the impact from falling industrial workpieces, including for example metal fasteners, and is readily replaceable within minimal labor and tooling to enhance the life expectancy and efficiency of the vibratory bowl feeder 10.

More specifically, the base 12 includes a rigid frame plate 22 with multiple leg portions 24 that are integrally formed to the rigid frame plate 22. The leg portions 24 include rubber isolators to limit the transfer of vibrations to the surrounding environment. The bowl 14 is supported above the base 12 and includes a bottom surface 26 and a sidewall 28. The sidewall 28 extends upwardly from the bottom surface 26 to define a bowl pan for receiving industrial workpieces or other objects. The bottom surface 26 is conical when shown in cross-section in FIG. 4, however in other embodiments the bottom surface 26 is flat. The sidewall 28 includes a spiral track 30 along its inner circumference. The entryway to the spiral track 30 converges with the bottom surface 28 and gradually rises to a discharge ramp 32. The bowl 14 receives the industrial workpieces in a random orientation, typically from an overhead hopper, and the spiral track 30 inclines upwardly from the bottom surface 26 of the bowl 14 to an apex 36, shown in FIGS. 2 and 3. From its apex 36, the track 30 slopes slightly downward toward the discharge ramp 32 for feeding the industrial workpieces one-by-one in a linear fashion.

Figure 3:
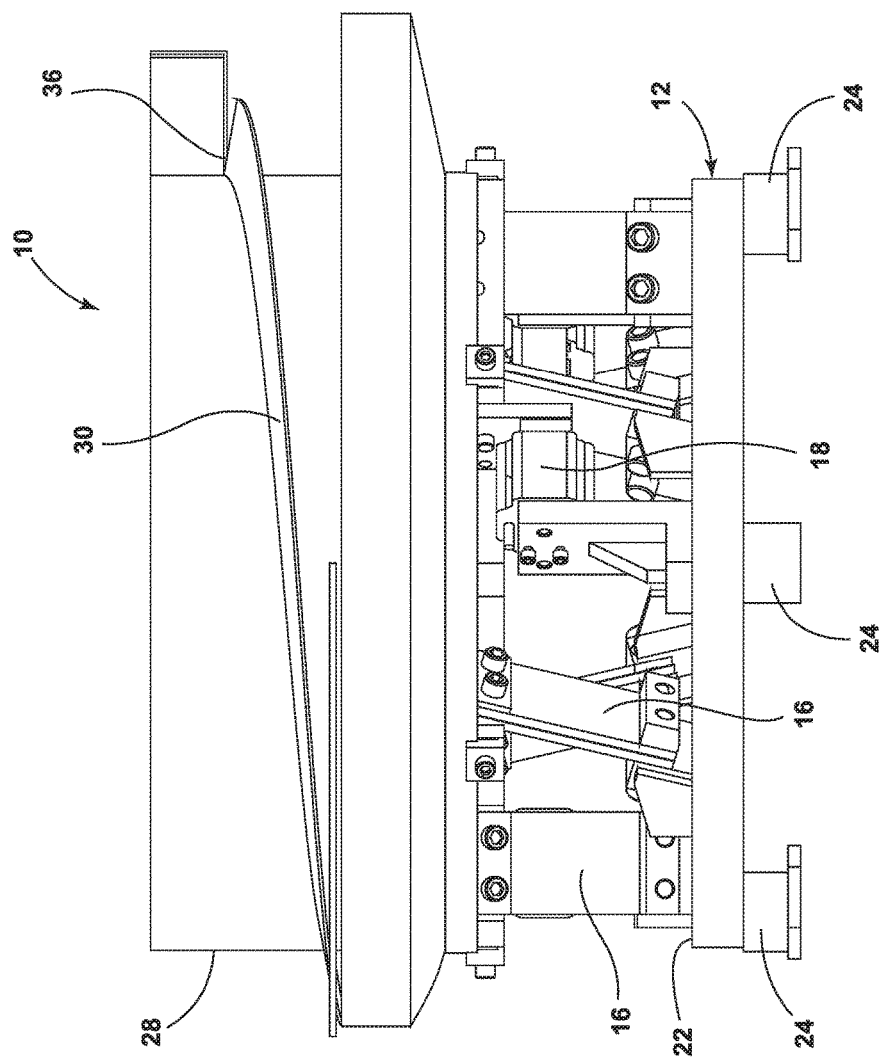
FIG. 3 is a side elevation view of the vibratory bowl feeder of FIG. 1.

As perhaps best shown in FIG. 3, multiple spring elements 16 are disposed between the base 12 and the bowl 14. Each exciter 18 includes an electromagnetic drive that creates movement by operating close to the resonance frequency of the vibratory bowl feeder 10. The electromagnetic drive is powered by one or more electromagnets arranged along the periphery of the spring elements 16, for example leaf springs or coil springs. In response to vibration of the vibratory bowl feeder 10, the industrial workpieces propagate along the spiral track 30 in the desired orientation until transferred at the discharge ramp 32 to an inspection and sorting machine. A suitable inspection and sorting machine is disclosed in U.S. Pat. No. 9,731,328 to DeFillipi et al entitled "Inspection and Sorting Machine," the contents of which are incorporated by reference in their entirety.

As noted above, the bowl 14 includes a removable impact cone 20. As used herein, the term "impact cone" means a three-dimensional structure having a lowermost portion that narrows as it transitions to its uppermost portion. In the illustrated embodiment, the exterior impact surface of the impact cone 20 is frusto-conical, that is, tapered and having the shape of a cone with the narrowed end or tip removed. In other embodiments, the exterior impact surface of the impact cone 20 is hemispherical. In still other embodiments, the exterior impact surface of the impact cone 20 is frusto-spherical; having the shape of a sphere with the tip removed. In these embodiments, the lower periphery of the impact cone defines a circle. In other embodiments, however, the impact cone 20 is segmented, such that the lower periphery of the impact cone defines a polygon. The particular shape and dimensions of the impact cone 20 can be selected based on the particular bowl 14, including for example the diameter of the bowl bottom surface 26 and the height of the bowl sidewall 28.

As noted above, the removable impact cone 20 is adapted to deflect downward falling industrial workpieces toward the sidewall 28. The impact cone 20 is generally formed from an impact resistant material, for example a thermoplastic polyamide such as nylon 6,6. Other impact resistant materials can also be used to form the impact cone, including for example other ultra-high molecular weight plastics. Consequently, the removable impact cone 20 is formed from a different material than the bowl 14, which is formed from stainless steel in the current embodiment. The removable impact cone 20 is truncated in the illustrated embodiment, including a flat tip 38 with a countersunk opening for a center bolt 40. The center bolt 40 extends through the countersunk opening entirely through the geometric center of the impact cone 20 and engages a threaded opening in the bowl 14. In addition, an adhesive is applied to the lower surface of the impact cone 20 or to the upper surface of the bowl 14 to bond the impact cone 20 to the bowl 14, the adhesive optionally being an epoxy glue.

Figure 4:
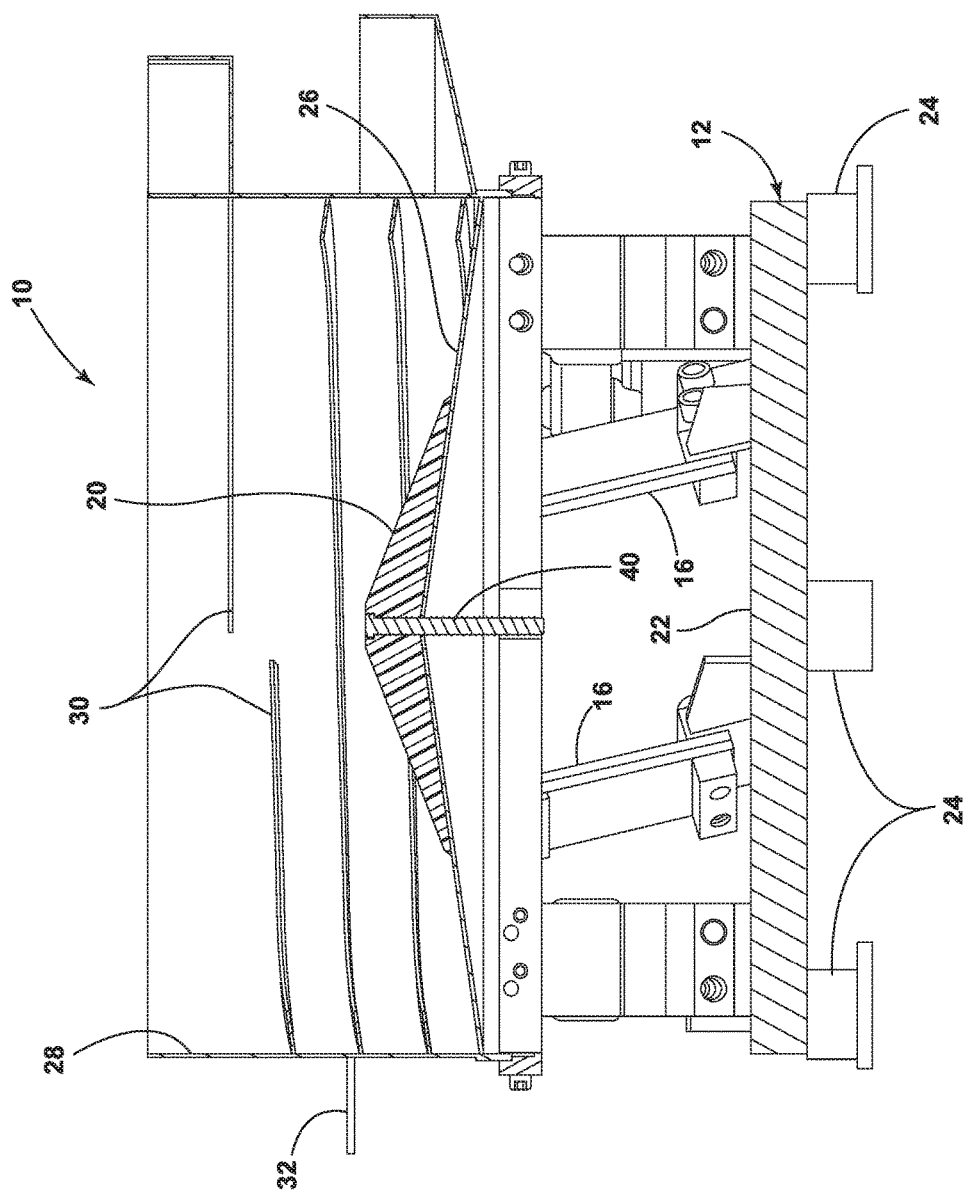
FIG. 4 is a cross-sectional view of the vibratory bowl feeder of FIG. 1 taken along line IV-IV of FIG. 2.

As further shown in FIG. 4, the bottom of the impact cone 20 is concave with a curvature that matches the convex bottom surface 26 of the bowl 14. In this respect, the bottom of the impact cone 20, i.e., its engagement surface, and the bottom surface 26 of the bowl 14 are complimentary along a continuous interface. The bottom surface 26 of the bowl 14 is conical, such that the vibratory bowl feeder 10 can also be used without the removable impact cone 20. The outer diameter of the impact cone 20 is less than the inner diameter of the sidewall 28, such that the sidewall 28 of the bowl 14 is spaced apart from the impact cone 20. The maximum height of the impact cone 20 is less than the maximum height of the sidewall 28, such that the impact cone 20 occupies minimal space within the bowl pan. As perhaps best shown in FIG. 2, the impact cone also includes a rotational symmetry about a vertical centerline axis.

Removal of the impact cone 20 is achieved with the loosening of the center bolt 40 and the retrieval of the impact cone 20 from the bottom surface 26. Installation of a new impact cone 20 is achieved with the application of an adhesive to the bottom of the new impact cone 20 or the bowl 14 and the tightening of the center bolt 40. As suggested above, this process can be performed with hand tools and with minimal disruption for the removal of the impact cone 20 and the installation of a new impact cone 20. As a disposable item, the used impact cone can be discarded or recycled after removal. The impact cone 20 can also be installed on existing vibratory bowl feeders that are in need of repair due to the bulk delivery of products deforming the existing stainless steel bowl pan.

The current embodiment is described above in relation to industrial workpieces, for example bolts, nuts, rivets, nails, and ball bearings. However, the vibratory bowl feeder of the present invention can also be used in connection with other bulk articles, including for example electronic subassemblies and pharmaceutical products. Though described above in connection with an overhead hopper and an inspection and sorting machine, the vibratory feeder of the present invention can be used in other applications as desired by the operator.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A vibratory bowl feeder comprising:
a base;
a bowl supported above the base and including a bottom surface and a sidewall integrally joined thereto to define a volume for receiving industrial workpieces, the bottom surface being cone-shaped, the bowl further including a spiral track along an inner circumference of the sidewall along which the industrial workpieces can propagate;
an impact cone detachably secured to the bottom surface of the bowl and formed from an impact resistant thermoplastic to deflect falling industrial workpieces toward the sidewall, a downward-facing surface of the impact cone matching the cone-shaped bottom surface of the bowl to define a continuous interface therebetween; and a plurality of spring elements between the base and the bowl and at least one exciter adapted to impart a vibration on the bowl for propagating the industrial workpieces upwardly along the spiral track in a predetermined orientation, wherein the bowl is formed from a different material than the impact cone and wherein the bottom surface of the bowl is sloped toward the sidewall to deflect falling industrial workpieces toward the sidewall without the impact cone installed.

2. The vibratory bowl feeder of claim 1 wherein the impact cone includes a through-hole for a center bolt, the center bolt securing the impact cone to the bowl.

3. The vibratory bowl feeder of claim 1 further including an adhesive layer for removably bonding the impact cone to the bowl.

4. The vibratory bowl feeder of claim 1 wherein the bottom surface of the bowl and the sidewall of the bowl are formed from stainless steel.

5. The vibratory bowl feeder of claim 1 wherein the impact resistant thermoplastic is a polyamide material.

6. The vibratory bowl feeder of claim 1 wherein the impact cone includes an exterior impact surface, the impact surface being frusto-conical.

7. The vibratory bowl feeder of claim 1 wherein the impact cone includes an exterior impact surface, the impact surface being hemispherical.

8. The vibratory bowl feeder of claim 1 wherein the impact cone includes an exterior impact surface with rotational symmetry about a vertical centerline axis of the impact cone.

9. A disposable impact cone for a vibratory bowl feeder including a bowl for receiving industrial workpieces, the bowl including a convex bottom surface, a sidewall integrally joined thereto, and a spiral track along which the industrial workpieces can propagate, the disposable impact cone comprising:

an impact surface extending between a lower extent of the impact cone and an upper extent of the impact cone, the impact surface being frusto-conical or hemispherical;

wherein the impact surface of the disposable impact cone is formed from an impact resistant thermoplastic to deflect falling industrial workpieces toward the sidewall, the bowl being formed of a different material than the impact cone;

wherein the upper extent of the impact cone and the lower extent of the impact cone define a through-hole for a center bolt, the through-hole extending along a vertical centerline axis of the impact cone; and wherein the convex bottom surface of the bowl is sloped toward the sidewall to deflect falling industrial workpieces toward the sidewall without the impact cone installed, and wherein a downward-facing surface of the impact cone is concave such that the impact cone and the convex bottom surface of the bowl define a continuous interface therebetween when the impact cone is installed onto the bowl.

10. The disposable impact cone of claim 9 wherein the impact resistant thermoplastic is a polyamide material.

11. The disposable impact cone of claim 10 wherein the polyamide material is nylon 6,6.

12. The disposable impact cone of claim 9 wherein the impact surface includes rotational symmetry about the vertical centerline axis of the impact cone.

* * * * *